(12) United States Patent
Murphy

(10) Patent No.: US 7,632,543 B2
(45) Date of Patent: Dec. 15, 2009

(54) METHOD OF MAKING IG WINDOW UNIT AND FORMING SILICON OXIDE BASED HYDROPHILIC COATING USING CHLOROSILANE VAPOR DEPOSITION

(75) Inventor: Nestor P. Murphy, West Bloomfield, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 123 days.

(21) Appl. No.: 11/633,648

(22) Filed: Dec. 5, 2006

(65) Prior Publication Data
US 2008/0128071 A1   Jun. 5, 2008

(51) Int. Cl.
C23C 16/22   (2006.01)

(52) U.S. Cl. ............................................. 427/255.395

(58) Field of Classification Search ............. 427/249.7, 427/255.11, 255.35
See application file for complete search history.

(56) References Cited

U.S. PATENT DOCUMENTS

| | | | |
|---|---|---|---|
| 6,592,992 B2 | 7/2003 | Veerasamy | |
| 6,632,491 B1 | 10/2003 | Thomsen et al. | |
| 6,649,212 B2 | 11/2003 | Payne et al. | |
| 6,663,753 B2 | 12/2003 | Veerasamy et al. | |
| 6,692,832 B2 | 2/2004 | Murphy | |
| 6,713,179 B2 | 3/2004 | Veerasamy | |
| 6,743,516 B2 * | 6/2004 | Murphy et al. | 428/447 |
| 6,749,941 B2 | 6/2004 | Lingle | |
| 6,782,718 B2 | 8/2004 | Lingle et al. | |
| 6,878,403 B2 | 4/2005 | Veerasamy et al. | |
| 6,878,404 B2 | 4/2005 | Veerasamy et al. | |
| 6,878,405 B2 | 4/2005 | Bienkiewicz et al. | |
| 6,908,679 B2 | 6/2005 | Stachowiak et al. | |
| 6,926,967 B2 | 8/2005 | Neuman et al. | |
| 6,946,171 B1 | 9/2005 | Aggas | |
| 6,964,731 B1 | 11/2005 | Krisko et al. | |
| 7,033,649 B2 | 4/2006 | Veerasamy | |
| 7,090,921 B2 | 8/2006 | Stachowiak | |
| 2002/0155299 A1 * | 10/2002 | Harris et al. | 428/428 |
| 2003/0215648 A1 | 11/2003 | Varanasi et al. | |
| 2004/0121168 A1 | 6/2004 | Goodwin et al. | |

* cited by examiner

*Primary Examiner*—Roberts Culbert
(74) *Attorney, Agent, or Firm*—Nixon & Vanderhye P.C.

(57) ABSTRACT

A method of making an insulating glass (IG) window unit is provided. The IG window unit includes at least two spaced apart substrates that are separated from one another by at least one seal and/or spacer, wherein a first one of the substrates supports a hydrophilic coating (e.g., silicon oxide) on the surface facing the building exterior and either of the substrates supports a solar management coating (e.g., a low-emissivity coating) for blocking infrared radiation.

15 Claims, 2 Drawing Sheets

METHOD OF MAKING IG WINDOW UNIT AND FORMING SILICON OXIDE BASED HYDROPHILIC COATING USING CHLOROSILANE VAPOR DEPOSITION

This invention relates to a method of making an insulating glass (IG) window unit. The IG window unit includes at least two spaced apart substrates that are separated from one another by at least one seal and/or spacer, wherein a first one of the substrates supports a hydrophilic coating (e.g., silicon oxide) on the surface facing the building exterior or interior, and either of the substrates supports a solar management coating (e.g., a low-emissivity coating) for blocking infrared radiation. Optionally, one of the substrates may support a UV blocking coating for blocking ultraviolet radiation.

BACKGROUND OF THE INVENTION

IG window units are known in the art, including, for example, those described in U.S. Pat. Nos. 6,632,491 and 6,946,171, which are hereby incorporated herein by reference. An IG window unit generally includes at least first and second substrates spaced apart from one another by at least one spacer and/or seal. The gap or space between the spaced apart substrates may be filled with a gas (e.g., argon) and/or may be evacuated to a pressure less than atmospheric pressure in different instances.

Many conventional IG window units include a solar management coating (e.g., a multi-layer coating for reflecting at least some infrared radiation) on an interior surface of one of the substrates. Example solar management or control coatings are described in U.S. Pat. Nos. 6,632,491, 6,926,967, 6,908,679, 6,749,941, 6,782,718, 6,576,349, and 7,090,921, the disclosures of which are hereby incorporated herein by reference. Such IG units may facilitate the blocking of significant amounts of infrared (IR) radiation, which may reduce the amount of IR radiation reaching the interior of the building (e.g., apartment, house, office building, etc.), via the solar control/management coating(s). Some conventional IG window units also include a coating for blocking ultraviolet (UV) radiation on the interior surface of one of the substrates.

Certain conventional IG window units lack a hydrophilic coating (e.g., an anti-fog coating) on an exterior/interior surface thereof. A hydrophilic coating may prevent the agglomeration of water drops into gobular shapes. That is, a hydrophilic coating is characterized by a low contact angle θ and may reduce bead-like condensation on the surfaces of the substrates in an IG window unit and, thus, may reduce the formation of tiny droplets of liquid. This film-wise (as opposed to droplet-wise) condensation may improve visibility through the IG window unit.

Silicon oxide coatings have been deposited on glass via sputter deposition. But once an IG window unit is assembled, it may be difficult to use sputter deposition to place such a layer on a glass surface because it would be difficult if not impossible to run an assembled IG unit through a sputter-coating apparatus.

There exists a need in the art to provide a method of assembling an IG (insulating glass) window unit, having a hydrophilic coating such as a coating of or including silicon oxide deposited on a surface of the unit via chemical vapor deposition.

SUMMARY OF EXAMPLE EMBODIMENTS OF THE INVENTION

Certain example embodiments of this invention relate to a method of making an IG window unit. The IG window unit includes at least two spaced apart substrates (e.g., glass substrates) that are separated from one another by at least one seal and/or spacer, wherein a first one of the substrates supports a hydrophilic coating on the surface facing the building exterior or interior, and at least one of the substrates supports a solar management coating (e.g., a low-emissivity coating) for blocking infrared radiation. Optionally, at least one of the substrates may have a UV coating.

The hydrophilic coating, which may comprise a layer of or including silicon oxide, is deposited via chemical vapor deposition. A contact angle θ can be measured between the surface of a bead of water and the surface of the hydrophilic coating. This contact angle θ is preferably less than or equal to 20 degrees, is more preferably less than or equal to 15 degrees, and is even more preferably less than or equal to 10 degrees.

According to one example embodiment of the present invention, a method of making a window unit includes: depositing a solar management coating on a first substrate, where the solar management coating has at least one layer for blocking at least some infrared (IR) radiation; optionally forming a ultraviolet blocking coating for blocking at least some ultraviolet radiation on a second substrate; coupling the first and second substrates to one another so that the respective coatings face each other across a gap provided between the two substrates; and depositing a hydrophilic coating via chemical vapor deposition on the first or second substrate.

In certain example embodiments of this invention, the hydrophilic coating may be formed by using chlorosilane chemistry. In certain example embodiments of this invention, silicon tetrachloride ($SiCl_4$) may be used in depositing the coating. In certain example embodiments of this invention, silicon tetrachloride reacts with $H_2O$, the Si attaches to $O_2$, and the $SiO_2$ attaches to the glass to form an $SiO_2$ based hydrophilic coating for the IG unit. The Cl from the silicon tetrachloride may attach to H so as to because HCl acid which can evaporate leaving the $SiO_2$ based hydrophilic coating on the glass substrate. Such a hydrophilic coating makes such window units easier to wash and clean in certain example embodiments of this invention.

According to another aspect of the present invention, a method of making a window unit includes: depositing a solar management coating on a first surface of a first substrate, where the solar management coating has at least one layer for blocking at least some infrared radiation; depositing a hydrophilic coating via chemical vapor deposition on a second surface of the first substrate; and coupling the first substrate to another second substrate in forming an IG window unit.

In certain example embodiments, the layer comprising silicon oxide may have a thickness of from about 500 to 1,000 Å and/or a surface roughness of about 4.0 nm or less.

DETAILED DESCRIPTION OF THE INVENTION

Figure 1:
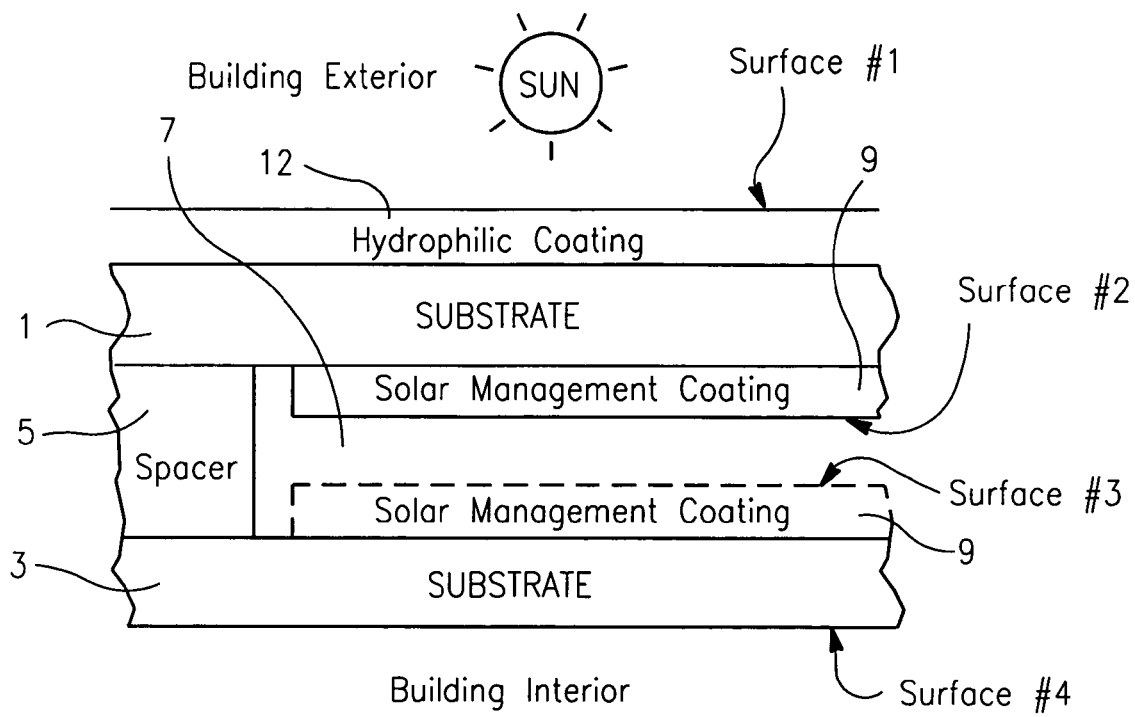
FIG. 1 is a cross-sectional view illustrating part of an IG window unit made in accordance with an exemplary embodiment of this invention.

Referring now more particularly to the accompanying drawings in which like reference numerals indicate like parts throughout the several views.

Certain example embodiments of this invention relate to an IG window unit including at least first and second spaced apart substrates (e.g., glass or plastic substrates having at least some visible transmission) that are separated from one another by at least one seal and/or spacer. The first or second substrate may support a solar management coating (e.g., low-E coating of any suitable type) for blocking at least some infrared (IR) radiation and, if the first substrate supports a solar management coating, the second substrate (or even the first substrate in certain instances) may optionally support a UV blocking coating for blocking at least some ultraviolet (UV) radiation. With regard to how much IR and UV radiation is blocked, in certain example embodiments of this invention the solar management coating may have an emissivity ($E_n$) of no greater than 0.10 and/or a sheet resistance ($R_s$) of no greater than 8 ohms/square, whereas the UV blocking coating may block at least 50% of UV radiation from 300 to 380 nm. One of the first and second substrates (e.g., one of the glass substrates) may support a hydrophilic coating, such as a layer comprising silicon oxide ($SiO_x$), on a surface facing the building exterior and/or interior.

FIG. 1 is a cross sectional view of a portion of an IG window unit according to an exemplary embodiment of this invention. As shown in FIG. 1, the IG window unit includes first glass substrate 1 and second glass substrate 3 that are spaced apart from one another at least by one or more peripheral seal(s) or spacer(s) 5. Optionally, an array of spacers (not shown) may be provided between the substrates in a viewing area of the window for spacing the substrates from one another as in the context of a vacuum IG window unit. The spacer(s) 5, other spacer(s), and/or peripheral seal space the two substrates 1 and 3 apart from one another so that the substrates do not contact one another and so that a space or gap 7 is defined therebetween. The space 7 between the substrates 1, 3 may be evacuated to a pressure lower than atmospheric in certain example embodiments, and/or may be filled with a gas (e.g., Ar) in certain example embodiments. Alternatively, space 7 between the substrates 1, 3 need not be filled with a gas and/or need not be evacuated to a low pressure. When substrate(s) 1 and/or 3 are of glass, each glass substrate may be of the soda-lime-silica type of glass, or any other suitable type of glass, and may be for example from about 1 to 10 mm thick in certain example embodiments of this invention. In certain embodiments (not shown), there may be additional substrates, such as three or more, that are each spaced apart with spacer(s) and that have the space between substrates optionally filled with a gas (e.g., Ar) and/or evacuated to a low pressure.

The IG window unit of FIG. 1 includes a solar management coating (e.g., low-E coating) 9 that is supported by glass substrate 1. Substrate 2 may also optionally support an optional solar management coating 9. That is, solar management coating 9 may be supported by substrate 1, substrate 2, or both. Solar management coating 9 includes one or more layers, although in many embodiments it is a multi-layer coating. Since one example function of solar management coating 9 is to block (i.e., reflect and/or absorb) certain amounts of IR radiation and prevent the same from reaching the building (or vehicle) interior, the solar management coating(s) 9 includes at least one IR blocking (i.e., IR reflecting and/or absorbing) layer. Example IR blocking layer(s) which may be present in coating(s) 9 are of or include silver (Ag), nickel-chrome (NiCr), gold (Au), and/or any other suitable material that blocks significant amounts of IR radiation. It will be appreciated by those skilled in the art that IR blocking layer(s) of solar management coating 9 need not block all IR radiation, but only need to block amounts thereof. In certain embodiments, each IR blocking layer is provided between at least a pair of dielectric layers. Example dielectric layers include silicon nitride, titanium oxide, silicon oxynitride, tin oxide, and/or other types of metal-oxides and/or metal-nitrides. In certain embodiments, in addition to being between a pair of dielectric layers, each IR blocking layer may also be provided between a pair of contact layers of or including a material such as an oxide and/or nitride of nickel-chrome or any other suitable material.

Of course, solar management coatings 9 herein are not limited to the above-listed coatings, and any other suitable solar management coating capable of blocking amounts of IR radiation may instead be used. For example and without limitation, any of the coatings described and/or illustrated in U.S. Pat. No. 6,632,491 (which is incorporated herein by reference) may also be used as a solar management coating. Solar management coatings 9 herein may be deposited on substrate(s) 1 and/or 3 in any suitable manner, including but not limited to sputtering, vapor deposition, and/or any other suitable technique. Typically, the solar management coating(s) 9 is/are deposited on the glass substrates 1 and/or 3 prior to the coupling of the glass substrates together in certain example embodiments of this invention.

Figure 2:
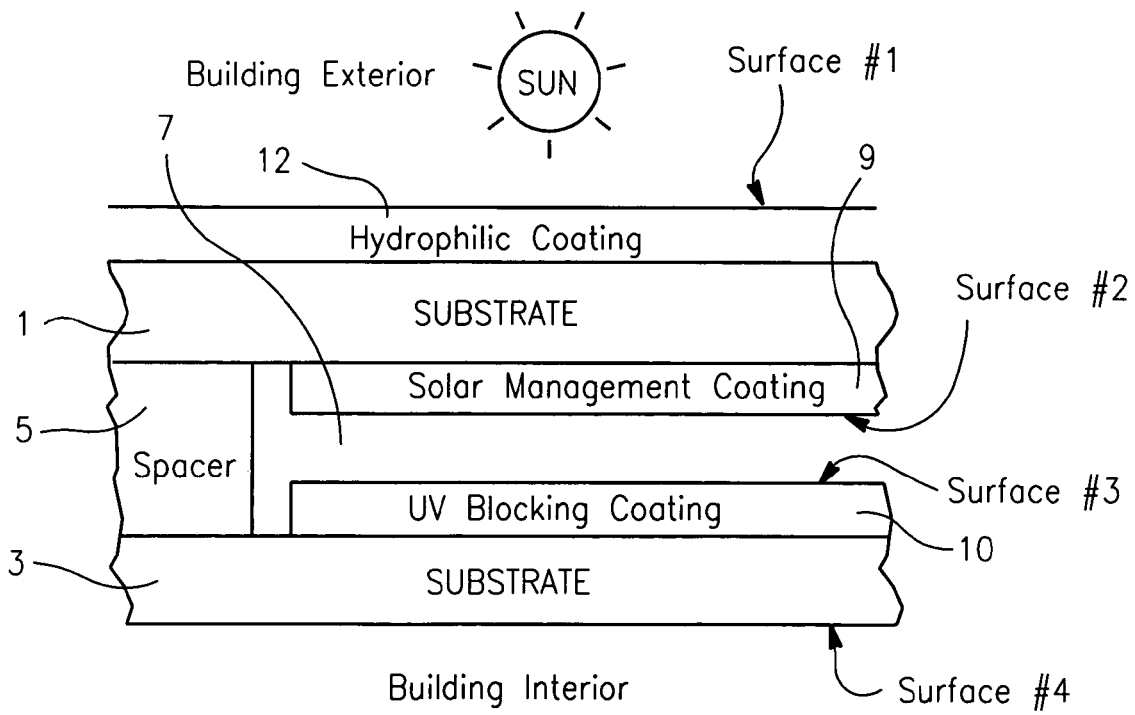
FIG. 2 is a cross-sectional view illustrating part of another IG window unit made in accordance with an exemplary embodiment of this invention.

Referring to FIG. 2, the IG window unit optionally includes UV blocking coating 10 for blocking significant amounts of UV radiation. UV blocking coating 10 may be, for purposes of example and without limitation, any suitable commercially available UV blocking coating such as a UV blocking coating available from Guardian Industries, Corp., Auburn Hills, Mich., or a silica based UV blocking coating available from Tru-Vue, Inc., Chicago, Ill. UV blocking coating 10 includes at least one layer, and blocks at least some UV radiation. For example and without limitation, any of the coatings described and/or illustrated in any of U.S. Pat. No. 5,332,618 or U.S. Pat. No. 5,371,138 (both incorporated herein by reference) may also be used as a UV blocking coating 10 in certain embodiments of this invention. In certain example embodiments of this invention, optional UV blocking coating 10 prevents at least about 50% of UV radiation (300-380 nm) reaching the same from passing therethrough, more preferably at least about 70%, even more preferably prevents at least about 80% of UV radiation reaching the same from passing therethrough, and most preferably prevents at least about 90% of UV radiation reaching the same from passing therethrough. In other words, optional UV blocking coating 10 preferably blocks at least about 50% of UV radiation (i.e., from 300-380 nm), more preferably at least about 70% of UV radiation, even more preferably at least about 80%, and most preferably at least about 90% of UV radiation. Optional UV blocking coating 10 may block UV radiation (from 300-380 nm) by, for example and without limitation, reflecting such UV radiation, absorbing such UV radiation, and/or converting amounts of such UV radiation into other type(s) of radiation (e.g., IR), and/or the like. It is noted that coating 10 is not limited to the precise coatings described above, as any suitable UV blocking coating may be used as coating 10 in different embodiments of this invention. UV blocking coatings 10 according to different embodiments of this invention may be formed in any suitable manner (e.g., via sputter coating, via vapor deposition, via capillary action, via roll(s) coating, and/or the like). Typically, the optional UV blocking coating 10 is deposited on the glass substrate 1 and/or 3 prior to the coupling of the glass substrates 1 and 3 together in certain example embodiments of this invention.

As shown in FIGS. 1 and 2, IG units typically are characterized as having four surfaces. In particular, surface #1 faces the building exterior, surface #2 is the interior coated/uncoated surface of the same substrate 1 but faces the interior space/gap 7 of the IG unit, surface #3 is the interior coated/uncoated surface of the other substrate 3 facing the interior space/gap 7, and surface #4 faces the building interior. In the FIG. 2 embodiment, solar management coating 9 is provided on surface #2 and UV blocking coating 10 is provided on surface #3. This is an example non-limiting arrangement of the coatings, as it enables much IR radiation to be blocked before reaching space 7 and/or coating 10. However, in alternative embodiments of this invention, the positions of coatings 9 and 10 may be reversed (that is, UV blocking coating 10 may be provided on surface #2 and solar management coating 9 may be provided on surface #3), or they may be provided on different surfaces in still further embodiments of this invention.

As shown in FIGS. 1 and 2, hydrophilic coating 12 of or including silicon oxide (e.g., $SiO_2$) is provided on surface #1 in exemplary embodiments of this invention. Hydrophilic coating 12 may be, for purposes of example and without limitation, any suitable commercially available hydrophilic coating. Hydrophilic coating 12 may be deposited on substrate 1 via chemical vapor deposition using techniques and reagents well known to ordinarily skilled artisans. For example and without limitation, hydrophilic coating 12 may comprise silicon oxide and optionally an overlayer of any suitable material.

In one example embodiment, hydrophilic layer 12 is comprised of silicon oxide ($SiO_x$) and is formed by vapor-deposition of a silicon-oxide forming compound onto a substrate 1 in a controllably humidified environment. In certain example embodiments, substrate 1 is glass. In certain embodiments of this invention, the silicon oxide layer 12 may be obtained by the reaction of a compound having a chlorosilyl group, such as silicon tetrachloride ($SiCl_4$), with the surface of the glass substrate to form a layer containing $SiO_2$. Other silanes that form silicon oxide may optionally, or additionally, be employed, such as hexachlorodisiloxane. When using silicon tetrachloride, it has been found that diluting 1 part the silicone tetrachloride with 10 parts pentane is particularly effective in certain example instances. In certain example embodiments, the layer of or including silicon oxide may have a thickness of from about 500 to 1,000 Å and/or a surface roughness of about 4.0 nm or less. Moreover, in certain example instances, the silicon oxide inclusive or based layer may provide a sheeting action of water flow, thereby resisting accumulation of dirt and/or water stains or the like.

Vapor-phase silicon tetrachloride may be introduced into a closed chamber having a controlled interior humidity environment which results in chlorine-terminated silicon oxide chains to attach directly to the glass substrate surface. It is believed that controlled humidity during vapor phase deposition of the silicon oxide layer may be helpful to achieve a coating with low haze characteristics. Thus, the humidity during vapor phase deposition of the silicon oxide layer from silicon tetrachloride may be less than about 50% relative humidity, and advantageously less than about 45% relative. In certain example embodiments, the relative humidity within the chamber may be controlled to be about 40% or less. The temperature may be approximately room temperature. Thus, the silicon oxide layer may possibly exhibit haze (non-specular light scattering) of less than about 3.0%, and typically less than about 2.0%. Advantageously, the haze of the silicon oxide layer may be less than about 1.5%, particularly less than about 0.8%. The lower limit of relative humidity, and hence haze value, of the silicon oxide anchor layer is generally determined by the surface roughness that is desired. In this regard, it is believed that the greater the humidity, the greater the surface roughness of the resulting silicon oxide anchor layer and vice versa.

The hydrophilic coating 12 may be produced using a closed reaction chamber configured to have an inlet opening for the chemical vapors, and a discharge opening to allow the chamber to be exhausted. The substrates are generally cleaned thoroughly and rinsed prior to being placed in the reaction chamber. The humidity within the chamber is typically controlled by the introduction of water vapor in dependence upon the chemical vapors being deposited. Thus, humidity within the reaction chamber of greater than about 10%, and less than about 80% are typically employed. The reaction chamber is most preferably maintained under ambient temperature (20-25° C.) and atmospheric pressure (about 1.0 atmosphere) conditions during the vapor deposition of the layers and coatings.

It is contemplated that other transparent layers may be employed in the practice of the present invention. Thus, a layer may be interposed between the substrate and the hydrophilic (e.g., silicon oxide) layer. In certain instances, this additional layer(s) may have an index of refraction which is between the indices of refraction exhibited by the hydrophilic layer 12 and the substrate 1.

Silicon oxide hydrophilic layer 12, according to certain example embodiments of this invention, has an index of refraction (n) of from about 1.4 to 1.6, more preferably of from about 1.45 to 1.6, and possibly from about 1.5-1.6. Glass substrate 1 typically has an index of refraction of about 1.52. Furthermore, at least one layer may be formed as a capping layer on the silicon oxide, and may exhibit an index of refraction that is between the indices of refraction of the hydrophilic layer 12 and air (1.0).

Figure 3:
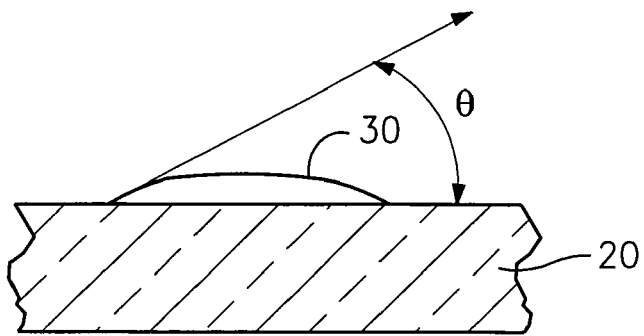
FIG. 3 is a cross-sectional partially schematic view illustrating a contact angle θ of a drop (e.g., a sessile drop of water) on a coated article.
Figure 4:
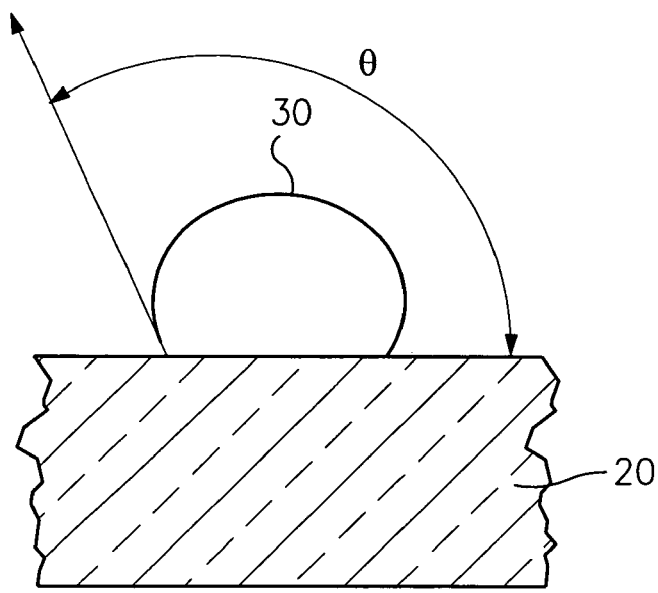
FIG. 4 is a cross-sectional partially schematic view illustrating a high contact angle θ of a drop (e.g., a sessile drop of water) on a coated article.
Figure 5:
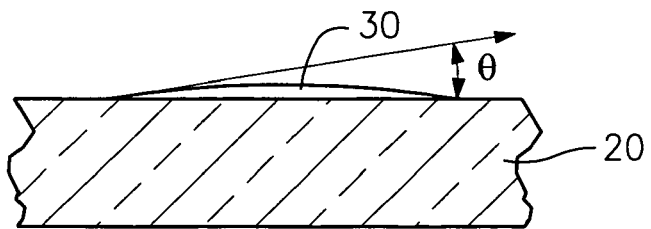
FIG. 5 is a cross-sectional partially schematic view illustrating a low contact angle θ of a drop on a coated article made in accordance with an exemplary embodiment of this invention.

FIGS. 3-5 generically illustrate a surface 20 and fluid drop 30 (e.g., a sessile drop of water), and contact angle θ formed between water drop 30 and surface. Coating 12 may exhibit a contact angle preferably less than or equal to 20 degrees, more preferably less than or equal to 15 degrees, and even more preferably less than or equal to 10 degrees.

Hydrophilic performance in any of the above embodiments is a function of contact angle θ, surface energy γ, and/or wettability or adhesion energy W. The surface energy γ of layer 20 may be calculated by measuring its contact angle θ. Exemplary contact angles θ are illustrated in FIGS. 3-5. A hydrophilic coating or layer system 12 according to an embodiment of this invention is on the substrate of FIG. 5, while no coating of any kind is on the substrate of FIG. 3 and a hydrophobic coating is on the substrate of FIG. 4. No substrates supporting the respective coatings are illustrated in FIGS. 3-5 for purposes of simplicity. To measure contact angle in one embodiment, a sessile drop 30 of a liquid such as water is placed on the substrate (e.g., with coating 12 thereon) as shown in FIGS. 3-5. A contact angle θ between the drop 30 and underlying article 20 appears, defining an angle θ depending upon the interface tension between the three phases at the point of contact. The contact angle is greater in FIG. 4 than in FIG. 3, because the coating layer (not shown) on the substrate in FIG. 4 is hydrophobic (i.e., results in a higher contact angle). However, due to this invention, the contact angle θ in FIG. 5 is lower than in either of FIGS. 3-4.

As described and claimed herein, all numerical values and ranges of numerical values are approximate and thus include a reasonable or insignificant amount of deviation from the stated numerical values.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a window unit, the method comprising:
   a) depositing a solar management coating on at least one of a first glass substrate and/or a second glass substrate, the solar management coating comprising at least one layer for blocking at least some IR radiation;
   b) coupling the first substrate and the second substrate to one another so that the solar management coating is on a surface facing a gap provided between the first and second glass substrates; and
   c) depositing via vapor deposition a layer comprising silicon oxide on an exterior surface of the first substrate, wherein the vapor deposition comprises a process of converting silicon tetrachloride into silicon oxide in the presence of H2O, wherein the layer comprising silicon oxide forms a hydrophilic surface having a water contact angle θ less than or equal to about 20 degrees, wherein said vapor deposition occurs at an ambient temperature, and wherein the layer comprising silicon oxide has a refractive index (n) of from about 1.4 to 1.6.

2. The method of claim 1, wherein the contact angle θ is less than or equal to 15 degrees.

3. The method of claim 1, wherein the contact angle θ is less than or equal to 10 degrees.

4. The method of claim 1, wherein steps a) and b) further comprise:
   a) depositing a solar management coating on the first substrate and depositing a UV blocking coating for blocking at least some ultraviolet radiation on the second substrate; and
   b) coupling the first substrate and the second substrate to one another so that the solar management coating is on a surface facing a gap provided between the first and second substrates and the UV blocking coating is on a surface facing the gap provided between the first and second substrates.

5. The method of claim 1, wherein said depositing comprises forming the layer comprising silicon oxide on the first substrate at a thickness of from about 500 to 1,000 Å and so as to have a surface roughness of about 4.0 nm or less.

6. A method of making a window unit, the method comprising:
   a) depositing a solar management coating on a first surface of a first glass substrate, the solar management coating comprising at least one layer for blocking at least some IR radiation;
   b) depositing via vapor deposition a layer comprising silicon oxide on a second surface of the first glass substrate, wherein the vapor deposition comprises a process of converting silicon tetrachloride into silicon oxide in the presence of water, wherein the vapor deposition occurs at a temperature of approximately 20-25° C., wherein the layer comprising of silicon oxide forms a hydrophilic surface having at least an initial water contact angle θ of less than or equal to about 20 degrees; and
   c) coupling the first glass substrate and a second substrate to one another so that the solar management coating is on a surface facing a gap provided between the first and second substrates and the layer comprising silicon oxide is on an exterior surface of the window unit.

7. The method of claim 6, wherein the layer comprising silicon oxide has a thickness of from about 500 to 1,000 Å and/or a surface roughness of about 4.0 nm or less.

8. The method of claim 6, wherein the contact angle θ is less than or equal to 15 degrees.

9. The method of claim 6, wherein the contact angle θ is less than or equal to 10 degrees.

10. The method of claim 6, the method further comprising:
    prior to coupling the first and second substrate, depositing a UV blocking coating for blocking at least some ultraviolet radiation on the second substrate; and
    coupling the first substrate and the second substrate to one another so that the solar management coating is on the surface facing the gap provided between the first and second substrates and the UV blocking coating is on a surface facing the gap provided between the first and second substrates.

11. The method of claim 6, wherein the layer comprising silicon oxide comprises SiO2.

12. The method of claim 6, wherein the layer comprising silicon oxide has a refractive index of from about 1.4-1.6.

13. A method of making a window unit, the method comprising:
    a) depositing a solar management coating on either a first substrate or a second substrate, the solar management coating comprising at least one layer for blocking at least some JR radiation;
    b) coupling the first substrate and the second substrate to one another so that the solar management coating is on a surface facing a gap provided between the first and second substrates; and
    c) depositing via vapor deposition at an ambient temperature a hydrophilic coating comprising silicon oxide on an exterior surface of the first substrate, wherein the hydrophilic surface forms a water contact angle θ less than or equal to about 20 degrees.

14. The method of claim 13, wherein the contact angle θ is less than or equal to 15 degrees.

15. The method of claim 13, wherein the contact angle θ is less than or equal to 10 degrees.

* * * * *